United States Patent
Taylor, III et al.

(10) Patent No.: US 7,464,539 B2
(45) Date of Patent: Dec. 16, 2008

(54) METHOD AND APPARATUS FOR SUPPLYING AIR TO EMISSION ABATEMENT DEVICE BY USE OF TURBOCHARGER

(75) Inventors: William Taylor, III, Columbus, IN (US); Yougen Kong, Greenwood, IN (US); Christopher R. Huffmeyer, Columbus, IN (US); Tomasz Kozakiewicz, Columbus, IN (US); John Abel, Freetown, IN (US)

(73) Assignee: Emcon Technologies LLC, Wilimington, DE (US)

( * ) Notice: Subject to any disclaimer, the term of this patent is extended or adjusted under 35 U.S.C. 154(b) by 139 days.

(21) Appl. No.: 11/118,821

(22) Filed: Apr. 29, 2005

(65) Prior Publication Data

US 2006/0242946 A1 Nov. 2, 2006

(51) Int. Cl.
*F01N 5/04* (2006.01)
(52) U.S. Cl. .............................. 60/280; 60/274; 60/278; 60/289; 60/293; 60/295
(58) Field of Classification Search .................. 60/274, 60/278, 280, 289, 290, 291, 292, 293, 295, 60/297
See application file for complete search history.

(56) References Cited

U.S. PATENT DOCUMENTS

| 4,033,133 | A | 7/1977 | Houseman |
| 4,735,186 | A | 4/1988 | Parsons |
| 5,852,927 | A | 12/1998 | Cohn et al. |
| 5,894,728 | A | 4/1999 | Wakamoto |
| 5,947,063 | A | 9/1999 | Smith |
| 5,974,789 | A * | 11/1999 | Mathes et al. .................. 60/274 |
| 6,167,698 | B1 * | 1/2001 | King et al. ..................... 60/286 |
| 6,227,180 | B1 * | 5/2001 | Hoffmann et al. ........... 123/564 |
| 6,311,650 | B1 | 11/2001 | Lamm |
| 6,560,958 | B1 | 5/2003 | Bromberg |
| 6,615,579 | B2 * | 9/2003 | Nishiyama ................... 60/285 |
| 6,702,991 | B1 | 3/2004 | Smaling |
| 6,817,173 | B2 * | 11/2004 | Paffrath et al. ................ 60/293 |
| 6,868,668 | B2 * | 3/2005 | Suzuki ........................ 60/286 |
| 2004/0020188 | A1 | 2/2004 | Kramer et al. |
| 2004/0020191 | A1 | 2/2004 | Kramer |
| 2004/0238349 | A1 | 12/2004 | Greathouse et al. |

* cited by examiner

*Primary Examiner*—Binh Q. Tran
(74) *Attorney, Agent, or Firm*—Barnes & Thornburg LLP

(57) ABSTRACT

An apparatus comprises a combustion engine, an emission abatement device, and a turbocharger. The emission abatement device is fluidly coupled to the engine to receive exhaust gas therefrom. The turbocharger comprises an air compressor that is fluidly coupled to the engine to supply pressurized air to the engine and that is fluidly coupled to the emission abatement device via a flow path not including any combustion section of the engine to supply pressurized air to the emission abatement device. An associated method is disclosed.

18 Claims, 3 Drawing Sheets

METHOD AND APPARATUS FOR SUPPLYING AIR TO EMISSION ABATEMENT DEVICE BY USE OF TURBOCHARGER

FIELD OF THE DISCLOSURE

The present disclosure relates generally to emission abatement devices.

BACKGROUND OF THE DISCLOSURE

Emission abatement device are used to treat a variety of emissions of exhaust gas. For example, there are emission abatement devices which serve to remove from exhaust gas particulate matter, NOx (i.e., oxides of nitrogen), hydrocarbons, and carbon monoxide.

SUMMARY OF THE DISCLOSURE

According to an aspect of the present disclosure, there is provided an apparatus comprising a combustion engine, an emission abatement device, and a turbocharger. The emission abatement device is fluidly coupled to the engine to receive exhaust gas therefrom. The turbocharger comprises an air compressor that is fluidly coupled to the engine to supply pressurized air to the engine and that is fluidly coupled to the emission abatement device via a flow path not including any combustion section of the engine to supply pressurized air to the emission abatement device. An associated method is disclosed.

According to another aspect of the present disclosure, an apparatus comprises an emission abatement component, a thermal regenerator configured to generate heat for regeneration of the emission abatement component, and a turbocharger comprising an air compressor fluidly coupled to the thermal regenerator via a flow path not including any engine combustion section to supply pressurized air to the thermal regenerator.

The above and other features of the present disclosure will become apparent from the following description and the attached drawings.

DETAILED DESCRIPTION OF THE DRAWINGS

Figure 1:
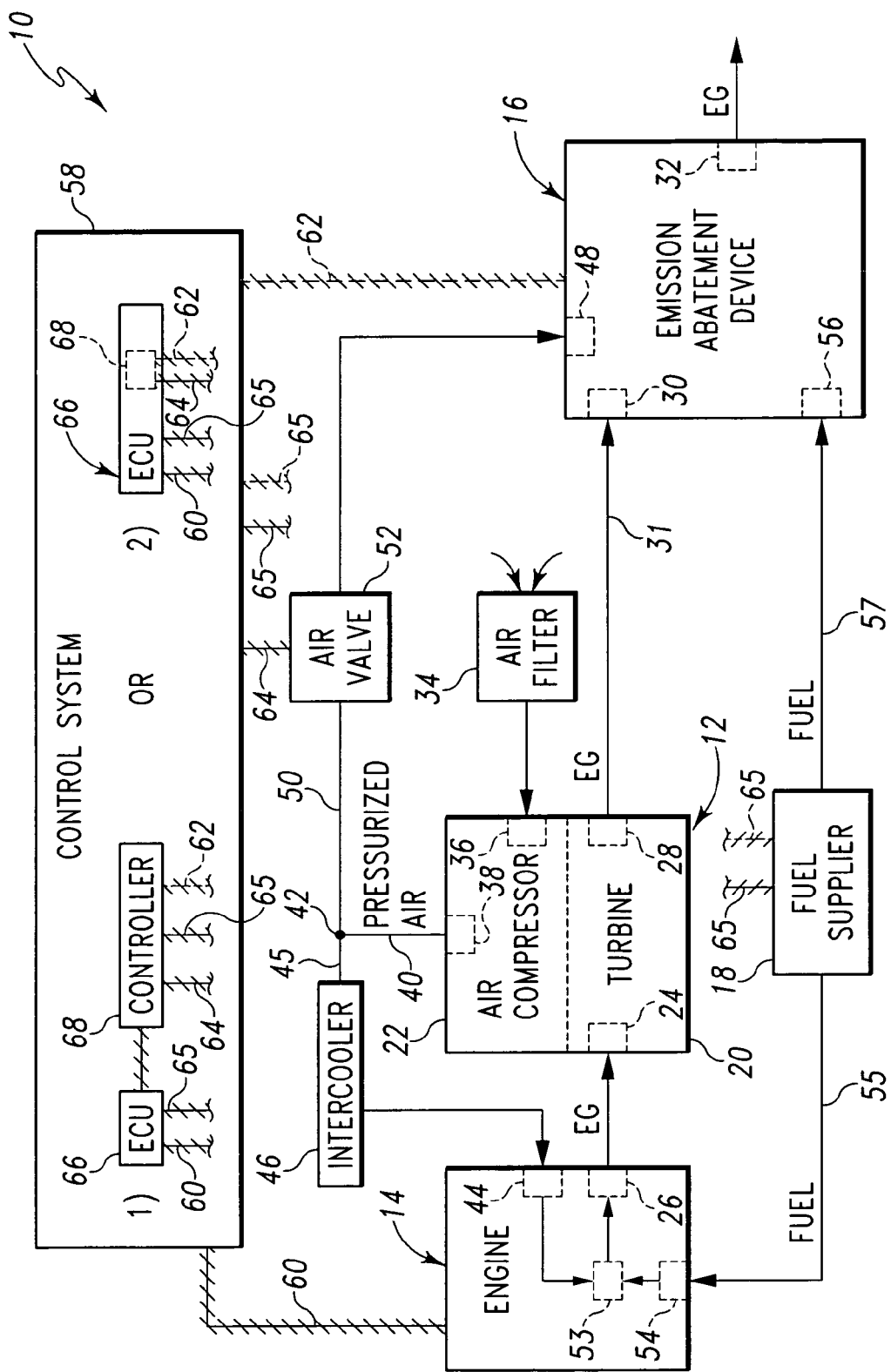
FIG. 1 is a simplified block diagram showing use of a turbocharger to supply pressurized air to both an engine and an emission abatement device.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an apparatus 10 comprising a turbocharger 12 for supplying pressurized air to both an internal combustion engine 14 (e.g., diesel engine) and an emission abatement device 16 configured to remove emissions from exhaust gas ("EG" in the drawings) of the engine 14. The engine 14 combusts fuel received from a fuel supplier 18 with pressurized air received from the turbocharger 12 in a combustion section of the engine 14 so as to generate exhaust gas which is used to operate the turbocharger 12. The emission abatement device 16 combusts fuel received from the fuel supplier 18 with pressurized air received from the turbocharger 12 to remove exhaust gas emissions.

The turbocharger 12 comprises a turbine 20 and an air compressor 22 operated by the turbine 20. An exhaust gas inlet 24 of the turbine 20 is fluidly coupled to an exhaust gas outlet 26 of the engine 14 to receive exhaust gas therefrom. The exhaust gas flows through the turbine 20 so as to cause the turbine 20 to operate the air compressor 22. The exhaust gas then exits the turbine 20 through an exhaust gas outlet 28 to flow to an exhaust gas inlet 30 of the emission abatement device 16 fluidly coupled to the exhaust gas outlet 28 of the turbine 20 via an exhaust line 31. After treatment by the emission abatement device 16, the exhaust gas exits the emission abatement device 16 through an exhaust gas outlet 32 thereof.

The air compressor 22 is mechanically coupled to the turbine 20 to be operated thereby in response to flow of exhaust gas through the turbine 20. Operation of the air compressor 22 causes air (e.g., unpressurized air such as ambient air) to advance through an air filter 34 into an air inlet 36 of the air compressor 22. The air compressor 22 pressurizes the air and discharges the pressurized air through an air outlet 38 to an air supply line 40.

The stream of pressurized air in the air supply line 40 is divided at a junction 42 into an engine air stream and a device air stream. The engine air stream flows from the junction 42 to an air inlet 44 of the engine 14 via an engine air line 45 connecting the junction 42 and the engine air inlet 44. An intercooler 46 in the engine air line 45 cools the engine air stream before it enters the engine 14. The air supply line 40 and the engine air line 45 thus cooperate to define a flow path for conducting pressurized air from the turbocharger 12 to the engine 14.

The device air stream flows from the junction 42 to an air inlet 48 of the emission abatement device 16 via a device air line 50 connecting the junction 42 and the device air inlet 48. An air valve 52 in the device air line 50 is operable to control flow of pressurized air from the air compressor 22 to the emission abatement device 16 and to thus control flow of pressurized air from the air compressor 22 to the engine 16. The air supply line 40 and the device air line 50 thus cooperate to define a flow path for conducting pressurized air from the turbocharger 12 to the emission abatement device 16. This flow path does not include any combustion section 53 of the engine 16 (e.g., any engine combustion chamber) so that the pressurized air supplied to the emission abatement device 16 has not been combusted with fuel in the engine 14.

The air valve 52 may take a variety of forms. In some examples, the air valve 52 may be a proportional valve (e.g., butterfly valve). In other examples, the air valve 52 may be an on/off shut-off valve (e.g., solenoid valve) used in combination with an airflow-metering orifice in the device air line 50.

The fuel supplier 18 supplies fuel to the engine 14 and to the emission abatement device 16. As such, the fuel supplier 18 is fluidly coupled to a fuel inlet 54 of the engine 14 via an engine fuel line 55 to supply fuel to the engine 14 and is fluidly coupled to a fuel inlet 56 of the emission abatement device 16 via a device fuel line 57 to supply fuel to the device 16. The fuel supplier may include a single fuel tank and fuel pump for both the engine 14 and the emission abatement device 16 or may include separate dedicated fuel tanks and fuel pumps for the engine 14 and the emission abatement device 16.

A control system 58 controls operation of the engine 14, the emission abatement device 16, the air valve 52, and the fuel supplier 18. The control system 58 is electrically coupled to the engine 14 via an electrical line 60 to control operation of the engine 14, is electrically coupled to the air valve 52 via an electrical line 64 to control operation of the valve 52, and is electrically coupled to the fuel supplier 18 via one or more electrical lines 65 to control operation of the fuel supplier 18. Depending on the type of emission abatement device 16, the control system 58 may also be electrically coupled to the emission abatement device 16 via an electrical line 62 to control operation of the device 16. It is within the scope of this disclosure for electrical line 62 to represent any type of suitable electrical connection between control system 58 and emission abatement device 16.

The control system 58 may take a variety of forms. In some examples, the control system 58 may include an engine control unit ("ECU") 66 for controlling operation of the engine 14 and a controller 68 for controlling operation of the air valve 52 and, when appropriate, the emission abatement device 16. In such a case, each of the ECU 66 and the controller 68 may control operation of the fuel supplier 18 via separate lines 65 to supply fuel to the engine 14 and the device 16, respectively, and the ECU 66 and the controller 68 may be electrically coupled to one another via an electrical line 70 (e.g., a CAN link) for communication therebetween. In other examples, the controller 68 is integrated into the ECU 66. In such a case, there may be only one electrical line 65 for communicating with the fuel supplier 18.

The ECU 66 may be configured to operate in two engine control modes. In such a case, the ECU 66 operates in the first engine control mode when the air valve 52 is closed to block flow of pressurized air from the compressor 22 to the emission abatement device 16 so that all the pressurized air flows from the compressor 22 to the engine 14. In the first engine control mode, the ECU 66 operates the engine 14 according to a first engine mapping scheme. The ECU 66 operates in the second engine control mode when the air valve is at least partially opened so that pressurized air flows from the compressor 22 to both the engine 14 and the emission abatement device 16. Exemplarily, about 95% of the pressurized air may flow to the engine 14 while the remaining 5% of pressurized air flows to the emission abatement device 16. In the second engine control mode, the ECU 66 operates the engine 14 according to a second engine mapping scheme to account for the reduction of air to the engine 14.

Figure 2:
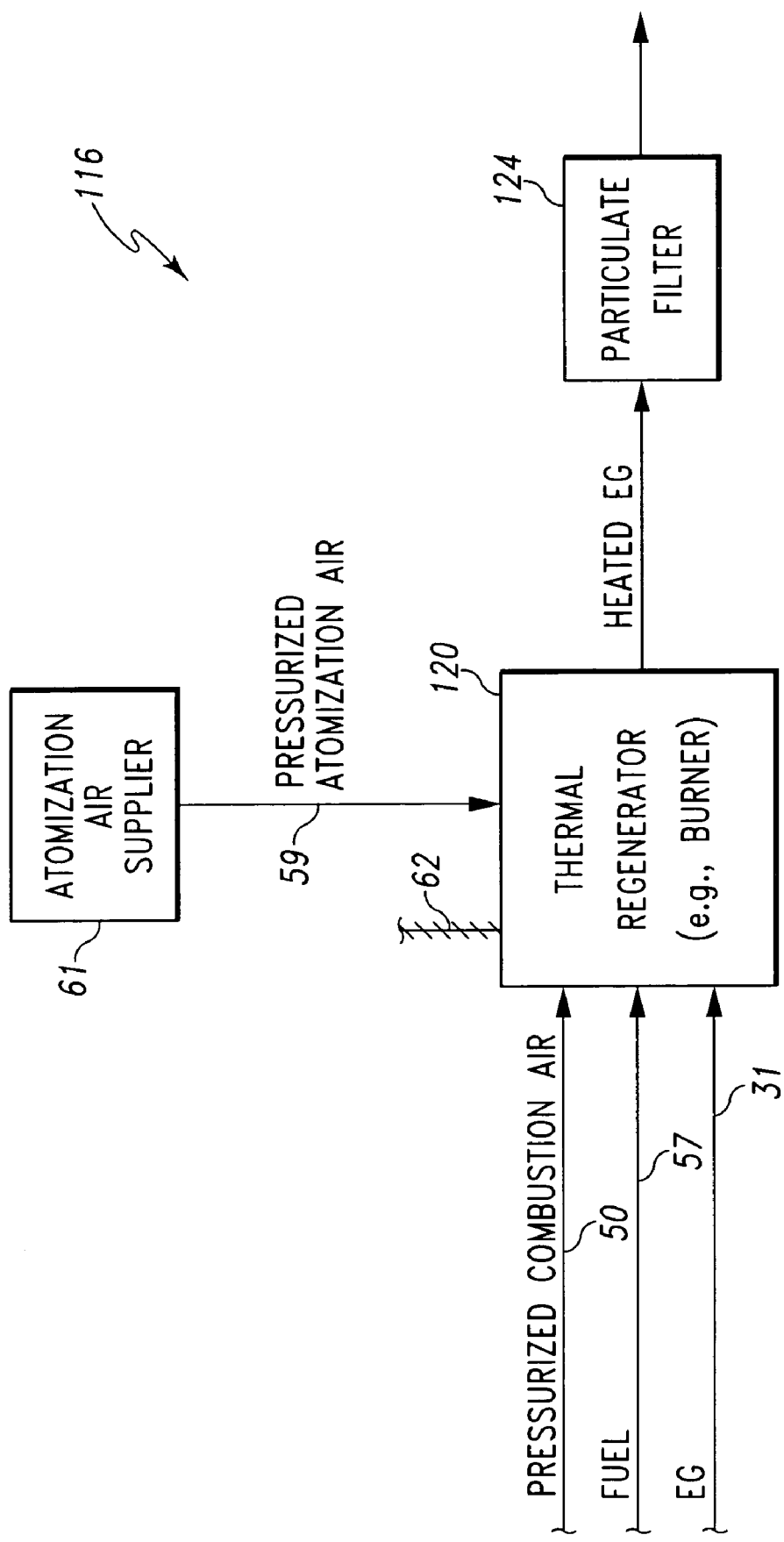
FIG. 2 is a simplified block diagram of a first embodiment of the emission abatement device.

Referring to FIG. 2, there is shown an emission abatement device 116 configured for use as the emission abatement device 16 in the apparatus 10. The device 116 includes a thermal regenerator 120 that generates heat for burning particulate matter trapped by a particulate filter 124. The generated heat in combination with oxygen present in the exhaust gas oxidizes the trapped particulate matter so as to regenerate the filter 124 for further use. The control system 58 operates the air valve 52, the fuel supplier 18, and the thermal regenerator 120 to regenerate the filter 124 on an as-needed basis, at regular or irregular time intervals (e.g., 1-4 times per day), and/or according to some other predetermined regeneration criteria.

Exemplarily, the thermal regenerator 120 is configured as a burner. In such a case, the thermal regenerator 120 receives fuel from the device fuel line 57, higher pressure fuel-atomization air from an atomization air supplier 61 via an atomization air line 59, and lower pressure combustion air from the air compressor 22 via the device air line 50. The atomization air supplier 61 may be the air brake system of a vehicle having the apparatus 10. The atomization air is used to atomize the fuel to promote combustion of the fuel with the combustion air. The combustion air has a lower pressure than the atomization air and is introduced into a combustion chamber of the thermal regenerator 120 for combustion with the fuel. Electrical power received from the control system 58 via the connection 62 is used to ignite the fuel in the combustion chamber. The air compressor 22 is able to supply a relatively high volume of combustion air to the thermal regenerator 120 to meet the combustion air needs of the thermal regenerator 120. Heat is thus generated by the thermal regenerator 120 for use in regenerating the filter 124. U.S. patent application Ser. No. 10/931,028, filed Aug. 31, 2004 and assigned to the same assignee as the present application, and U.S. patent application Ser. No. 10/894,548, filed Jul. 20, 2004 and assigned to the same assignee as the present application, are hereby incorporated by reference herein for disclosure of suitable thermal regenerators 120.

It is within the scope of this disclosure for the emission abatement device 116 to include an air-fuel mixer upstream from the thermal regenerator 120. In such a case, the mixer mixes air received from the device air line 50 with fuel received from the device fuel line 57 and supplies the air-fuel mixture to the thermal regenerator for combustion thereby to generate heat for burning the particulate matter trapped by the filter 124.

Figure 3:
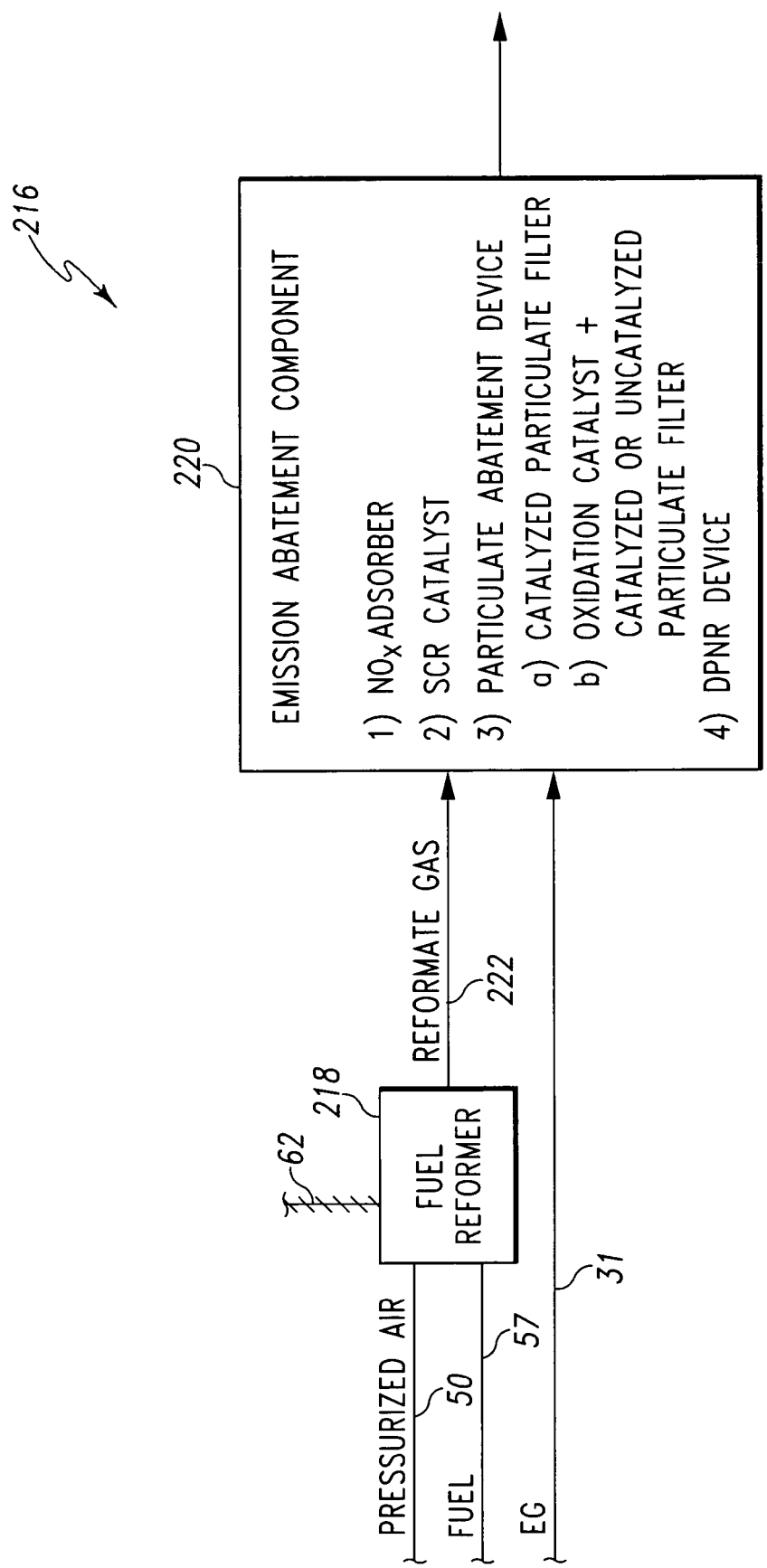
FIG. 3 is a simplified block diagram of a second embodiment of the emission abatement device.

Referring to FIG. 3, there is shown an emission abatement device 216 configured for use as the emission abatement device 16 in the apparatus 10. A fuel reformer 218 of the device 216 uses pressurized air supplied from the turbocharger 12 via the device air line 50 to reform fuel supplied from the fuel supplier 18 via the device fuel line 57 into reformate gas (e.g., $H_2$, CO). The reformate gas is advanced to an emission abatement component 220 via a reformate gas line 222 for use in connection with the component 220. Exhaust gas is also advanced to the component via the exhaust line 31.

The fuel reformer 218 may be embodied as any type of fuel reformer such as, for example, a catalytic fuel reformer, a thermal fuel reformer, a steam fuel reformer, or any other type of partial oxidation fuel reformer. The fuel reformer 218 may also be embodied as a plasma fuel reformer which uses plasma (i.e., an electrical arc) to convert a mixture of air and hydrocarbon fuel into the reformate gas. Systems including plasma fuel reformers are disclosed in U.S. Pat. Nos. 5,425,332, 5,437,250, 5,409,784, and 5,887,554, U.S. patent application Ser. No. 10/452,623, and U.S. Provisional Patent Application No. 60/660,362, the disclosures of which are hereby incorporated by reference herein. In the case where the fuel reformer 218 is a plasma fuel reformer, the electrical line 62 supplies electrical power to the reformer 218 to generate the plasma therein for reformation of the fuel into the reformats gas.

The component 220 may take a variety of forms. In one example, the component 220 is a NOx adsorber that traps NOx under lean conditions. The exhaust gas flow through the NOx adsorber may be enriched from time to time by operation of the reformer 218. Under such rich conditions, the trapped NOx is released and reduced to nitrogen. According to another example, the component is a selective catalytic reduction catalyst that catalyzes a reaction between one or more constituents of the reformate gas and NOx present in the exhaust gas so as to reduce the NOx. In another example, the component is a particulate abatement device in the form of a catalyzed particulate filter or an oxidation catalyst in combination with a catalyzed or uncatalyzed particulate filter. According to yet another example, the component may be a diesel particulate-NOx reduction device ("DPNR device") configured as an integrated NOx adsorber and particulate filter.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method, comprising
operating a turbocharger so as to advance pressurized air (i) from the turbocharger to a combustion engine and (ii) from the turbocharger to a thermal regenerator of an emission abatement device via a flow path not including any combustion section of the engine;
advancing exhaust gas to the thermal regenerator; and
advancing heated exhaust gas from the thermal regenerator to a particulate filter of the emission abatement device to burn particulate matter trapped by the particulate filter.

2. The method of claim 1, wherein the operating step comprises:
operating a turbine of the turbocharger with exhaust gas of the engine, and
operating an air compressor of the turbocharger in response to operation of the turbine so as to advance pressurized air from compressor to the engine and the emission abatement device.

3. The method of claim 1, wherein the operating step comprises:
dividing a stream of pressurized air discharged from an air compressor of the turbocharger into a first air stream and a second air stream,
advancing the first air stream to the engine, and
advancing the second air stream to the emission abatement device.

4. The method of claim 1, wherein the operating step comprises operating an air valve to control flow of pressurized air from the turbocharger to the engine and to the emission abatement device.

5. The method of claim 1, wherein:
the emission abatement device comprises a fuel reformer, and
the operating step comprises simultaneously advancing pressurized air from the turbocharger to the engine and from the turbocharger to the fuel reformer.

6. An apparatus, comprising:
a combustion engine,
an emission abatement device comprising a burner to burn particulate matter trapped by a particulate filter of the emission abatement device, the burner fluidly coupled to the engine to receive exhaust gas therefrom, and
a turbocharger comprising an air compressor that is fluidly coupled to the engine to supply pressurized air to the engine and that is fluidly coupled to the burner of the emission abatement device via a flow path not including any combustion section of the engine to supply pressurized air to the burner of the emission abatement device.

7. The apparatus of claim 6, wherein:
the engine comprises an air inlet and an exhaust gas outlet,
the emission abatement device comprises an air inlet and an exhaust gas inlet,
the air compressor comprises a pressurized air outlet fluidly coupled to the air inlets of the engine and the emission abatement device, and
the turbocharger comprises a turbine comprising (i) an exhaust gas inlet fluidly coupled to the exhaust gas outlet of the engine and (ii) an exhaust gas outlet fluidly coupled to the exhaust gas inlet of the emission abatement device.

8. The apparatus of claim 6, further comprising first, second, and third air lines secured to one another at a junction, wherein:
the first air line connects the air compressor and the junction,
the second air line connects the junction and the engine, and
the third air line connects the junction and the emission abatement device.

9. The apparatus of claim 8, wherein the third air line comprises an air valve.

10. The apparatus of claim 6, wherein:
the emission abatement device comprises a component and a fuel reformer fluidly coupled to the component to supply reformate gas thereto, and
the air compressor is fluidly coupled to the fuel reformer to supply pressurized air thereto.

11. The apparatus of claim 10, wherein the fuel reformer is a plasma fuel reformer and the emission abatement component is a NOx adsorber.

12. The apparatus of claim 6, further comprising an air valve configured to control flow of pressurized air from the air compressor to the engine and to the emission abatement device.

13. The apparatus of claim 12, further comprising (i) an engine control unit electrically coupled to the engine and (ii) a controller electrically coupled to the engine control unit, the air valve, and the emission abatement device.

14. The apparatus of claim 12, further comprising an engine control unit electrically coupled to the engine, the air valve, and the emission abatement device.

15. The apparatus of claim 6, further comprising an engine control unit configured to control the engine according to a first engine control mode when pressurized air is advanced from the air compressor to the engine but not to the emission abatement device and configured to control the engine according to a second engine control mode when pressurized air is advanced from the air compressor to the engine and to the emission abatement device.

16. An apparatus, comprising:
an emission abatement component,
a thermal regenerator configured to receive exhaust gas of a combustion engine and to generate heat for regeneration of the emission abatement component, and
a turbocharger comprising an air compressor fluidly coupled to the thermal regenerator via a flow path not including any engine combustion section to supply pressurized air to the thermal regenerator.

17. The apparatus of claim 16, further comprising a fuel supplier and an atomization air supplier, wherein:
- the emission abatement component comprises a particulate filter,
- the thermal regenerator comprises a fuel-fired burner for burning particulate matter trapped by the particulate filter,
- the fuel supplier is fluidly coupled to the burner,
- the atomization air supplier is fluidly coupled to the burner to supply fuel-atomization air for atomization of fuel supplied by the fuel supplier, and
- the turbocharger comprises (i) a turbine fluidly coupled to an exhaust gas outlet of a combustion engine and (ii) an air compressor mechanically coupled to the turbine to be operated thereby and fluidly coupled to the burner to supply combustion air for combustion with fuel supplied by the fuel supplier.

18. The apparatus of claim 16, further comprising a combustion engine, wherein the turbocharger is also fluidly coupled to the engine to supply pressurized air thereto.

* * * * *